United States Patent
Harris et al.

(10) Patent No.: US 8,709,572 B2
(45) Date of Patent: Apr. 29, 2014

(54) FABRICATION OF HIGH GRADIENT INSULATORS BY STACK COMPRESSION

(75) Inventors: John Richardson Harris, Monterey, CA (US); Dave Sanders, Pine Grove, CA (US); Steven Anthony Hawkins, Livermore, CA (US); Marcelo Noroña, West Hills, CA (US)

(73) Assignees: Lawrence Livermore National Security, LLC., Livermore, CA (US); Lockwood Industries, Inc., Valencia, CA (US)

( * ) Notice: Subject to any disclaimer, the term of this patent is extended or adjusted under 35 U.S.C. 154(b) by 0 days.

(21) Appl. No.: 13/429,081

(22) Filed: Mar. 23, 2012

(65) Prior Publication Data

US 2013/0251933 A1    Sep. 26, 2013

(51) Int. Cl.
*B32B 3/02*    (2006.01)

(52) U.S. Cl.
USPC .......... 428/64.1; 156/228; 156/285; 250/283; 250/396 R; 438/396

(58) Field of Classification Search
USPC ........................ 428/64.1; 156/285; 250/396 R
See application file for complete search history.

(56) References Cited

U.S. PATENT DOCUMENTS

2010/0078198 A1*    4/2010    Harris et al. .............. 174/140 R

FOREIGN PATENT DOCUMENTS

WO    WO 9833228 A2 *    7/1998

* cited by examiner

*Primary Examiner* — Elizabeth Mulvaney
(74) *Attorney, Agent, or Firm* — John P. Wooldridge

(57) ABSTRACT

Individual layers of a high gradient insulator (HGI) are first pre-cut to their final dimensions. The pre-cut layers are then stacked to form an assembly that is subsequently pressed into an HGI unit with the desired dimension. The individual layers are stacked, and alignment is maintained, using a sacrificial alignment tube that is removed after the stack is hot pressed. The HGI's are used as high voltage vacuum insulators in energy storage and transmission structures or devices, e.g. in particle accelerators and pulsed power systems.

24 Claims, 6 Drawing Sheets

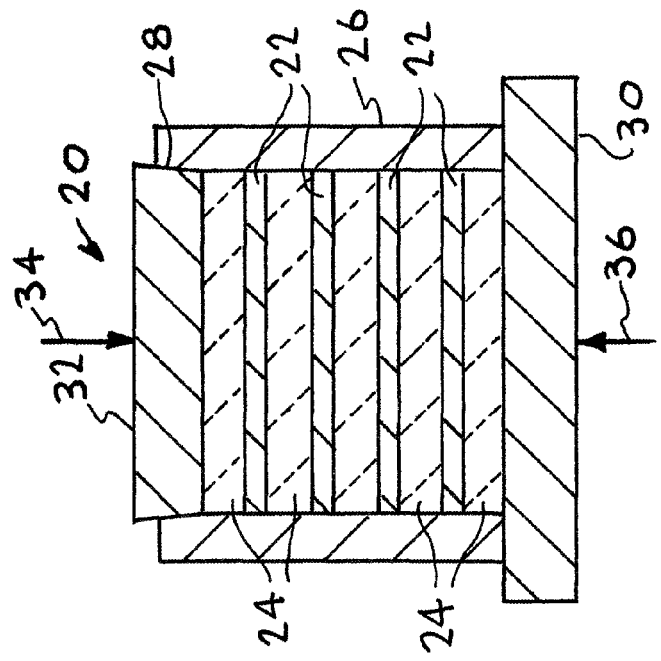
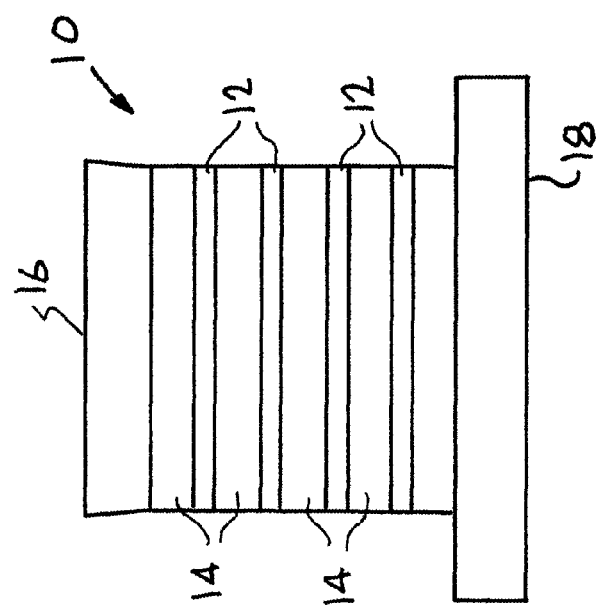

FABRICATION OF HIGH GRADIENT INSULATORS BY STACK COMPRESSION

GOVERNMENT RIGHTS

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

This invention pertains generally to high voltage vacuum insulators for particle accelerators and pulsed power systems, and more particularly to high gradient insulators (HGI's) formed from alternating layers of metal and dielectric, and most particularly to methods for forming same.

2. Description of Related Art

Various structures or devices for storing or transmitting electrical energy, e.g. capacitors, transmission lines, and accelerator components (e.g. Blumlein pulse generators), are constructed with pairs of conductors separated by insulators. These conductors generally form electrodes or transmission lines. For high voltages to be placed on these electrodes or transmission lines, the underlying insulator must not break down. To make the structures or devices compact, the components, both conductors and insulators, must generally be made as thin as possible, requiring high gradients across the insulators. This magnifies the problem of breakdown.

The electrical strength of vacuum insulators is thus a key constraint in the design of particle accelerators and pulsed voltage systems. Many potential applications of these systems require minimizing the volume occupied by the system, so there is always a drive to reduce the size of the insulator interfaces. Vacuum insulating structures assembled from alternating layers of metal and dielectric can result in improved performance compared to conventional insulators.

Therefore particle accelerator and pulsed power system design depends on the voltage-holding ability of their vacuum insulators. When subjected to strong electric fields, the vacuum insulators generally fail by surface flashover rather than through the bulk material. It has long been known that the electric field that can be sustained by an insulator scales as $(\text{length})^{-1/2}$. This suggests that a structure composed of thin dielectric layers would be able to withstand a higher field than a monolithic insulator of the same length and dielectric material, which is the basis of the "high gradient insulator" (HGI) concept. HGI's consist of alternating layers of dielectric and metal and have been shown to withstand gradients up to four times higher than conventional insulators.

Currently HGI's are prepared by machining or water-jet cutting laminated sheets of material to the desired shape. In this method, a laminated structure of sheets of material is first formed. The HGI is then cut out of the laminated structure. This is relatively expensive and results in the waste of material that is left in the lamination after the HGI's have been cut. It also limits the ability to tailor the geometry of the insulator surface in ways that could further increase the voltage-holding ability of these structures.

The prior art method uses alternating layers of dielectric, adhesive, and metal to form a stack, much like the layers of paper in a closed book. The stack is assembled, and then heated while pressure is applied to it. The final HGI's (usually right cylinders) are machined out of the stack by machine tools or water jets. This may work fine for very small stacks, an inch or less in thickness. However, machine tools or water jets have difficulty cutting through very thick stacks, so as the stack becomes thicker, more specialized . and expensive machines are needed to accomplish this.

The prior art process may also negatively affect the voltage-holding capability of the HGI's. When an insulator fails in vacuum, it usually fails by an electrical discharge along the insulator/vacuum interface (the insulator surface). The geometry of that surface is critical to the performance of the insulator. In the case of HGI's, the geometry of both the metal and dielectric layers is important. The surface structure of HGI's formed by machining or water jet cutting is known to differ from the ideal. It is also known that machining can cause deformation of the metal layers, which can lead to vacuum arcing. In addition, the machining process heats the material, which can lead to internal stresses in the insulator stack. These stresses could cause delamination of the HGI's, and probably also cause the dielectric layers to be recessed below the metal layers when the HGI's cool. The bottom line is that the machining and water jet cutting processes strongly affect the surface structure of the insulators in ways which are generally bad, but poorly-controlled.

Accordingly, it is desired to provide an improved method of forming HGI's.

BRIEF SUMMARY OF THE INVENTION

An aspect of the invention is a method of making a high gradient insulator (HGI) having a desired cross-section and height, by providing a plurality of conductor layers and of dielectric layers, each layer having the desired cross-section of the HGI; providing an alignment tube; stacking alternating conductor layers and dielectric layers, each with the desired cross-section, in or around the alignment tube to form a stacked assembly of substantially the desired height; bonding the stacked assembly of alternating conductor layers and dielectric layers together while stacked in or around the alignment tube; and removing the alignment tube from the bonded stacked assembly to form the HGI.

Another aspect of the invention is a method of making a high gradient insulator (HGI), by pre-cutting individual layers of the HGI to their final dimensions; stacking the individual pre-cut layers to form an assembly; and pressing the assembly into an HGI unit with the desired dimensions. The pre-cut individual layers are stacked in or around a sacrificial alignment tube to form the assembly, and the alignment tube is removed after pressing the assembly.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a cross-sectional view of a high gradient insulator (HGI) as is known in the prior art.

DETAILED DESCRIPTION OF THE INVENTION

Referring more specifically to the drawings, for illustrative purposes the present invention is embodied in the apparatus and method generally shown in FIG. 1 through FIGS. 7A, B. It will be appreciated that the apparatus may vary as to configuration and as to details of the parts, and the method may vary as to its particular implementation, without departing from the basic concepts as disclosed herein.

The invention applies to basic energy storage and transmission structures or devices, particularly compact structures or devices designed to receive high energy. The essential elements of these structures or devices are a pair of electrical conductors, separated by an insulator, across which a voltage is placed.

The invention applies to energy storage and transmission structures or devices in which the insulators are high gradient insulators (HGI's). According to the invention, individual layers of the HGI are first pre-cut to their final dimensions and then stacked to form an assembly that is subsequently pressed into an HGI unit with the desired dimensions. The individual layers are stacked, and alignment is maintained, using an alignment tube.

FIG. 1 shows the basic structure of a high gradient insulator (HGI) 10 formed of a stack of alternating thin conductor layers 12 and dielectric layers 14, as is known in the prior art. Electrodes 16, 18 are formed on the top and bottom of the stack. Conductor layers 12 typically have thicknesses of about 0.01 mm to about 1 mm and are typically made of metals and alloys, such as stainless steel, molybdenum, and Kovar (a Ni Co ferrous alloy. Dielectric layers 14 typically have thicknesses of about 0.1 mm to about 1 mm and are typically made of insulator materials, such as plastics or ceramics, e.g. Rexolite (a polystyrene plastic), alumina, or polyimide, e.g. Cirlex (a polyimide plastic). HGI 10 is made up of N alternating layers 12, 14, where N depends entirely on the dielectric and conductor layer thicknesses and the distance to be spanned by the insulator. The function of the HGI is to make the electric strength of the overall insulator depend only on those layer thicknesses, and not on the distance to be spanned.

The invention is a method for making an HGI 10 having a structure as shown in FIG. 1. The HGI 10 typically has one of two different shapes, a solid cylinder or a cylinder with a central bore. The methods of making both of these structures, according to the invention, are illustrated in FIGS. 2A-C and 3A-C respectively.

Figure 2B:
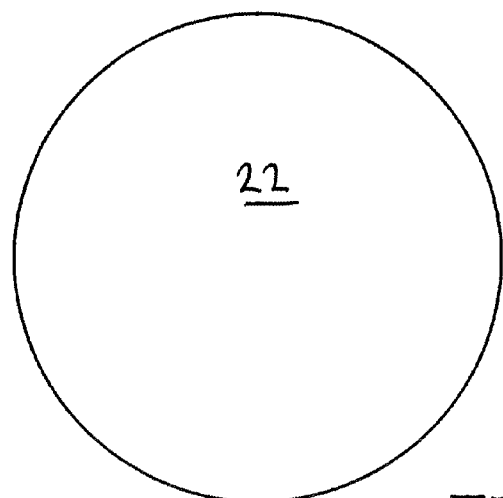
FIGS. 2B, C are top plan views of individual metal and dielectric layers, respectively, for the fabrication of an HGI, as in FIG. 2A, according to the invention.

FIG. 2A shows the fabrication of an HGI 20 having a solid cylinder shape. HGI 20 is formed of alternating conductor layers 22 and dielectric (insulator) layers 24. Individual conductor and dielectric (insulator) layers 22, 24 respectively are shown in FIGS. 2B, C and have circular disc shapes. These layers can have any desired diameter. The conductive layers 22 are typically made of stainless steel, molybdenum, Kovar, or other metals or alloys, and have thicknesses of about 0.01 mm to about 1 mm. The dielectric layers 24 are typically made of plastic or ceramic, e.g. Rexolite, alumina, Cirlex, or polyimide, and have thicknesses of about 0.1 mm to about 1 mm.

One key to the success of the manufacturing approach of the invention is the manner of production of the individual layers 22, 24. If metal is used for the conducting layers 22 and plastic for the dielectric (insulator) layers 24, a good approach is stamping. In the case of metal, a "fine blanking" technique is recommended to provide metal parts with sharp, well-defined edges. The layers 22, 24 can easily be stamped out of or otherwise cut from sheets of the appropriate material. The stamping or other process can provide stacks of each layer material of the desired shape that can be placed in an HGI assembly robot for further use in efficiently carrying out the invention.

Another key to the successful implementation of the fabrication method of the invention is the ability to maintain the alignment of the individual layers while they are assembled and up to the completion of the pressing operation where the individual layers are bonded into complete HGI units. This is accomplished with a sacrificial alignment tube. The alignment tube typically is a cylindrical tube and preferably has a tapered top edge that facilitates the placement of each layer in the alignment tube. The precise alignment of the multiple layers of the HGI is required to avoid the need for subsequent machining of the final HGI unit. The alignment tube is an essential part of the invention, and upper and lower pressure plates are preferably used in combination therewith to facilitate forming and bonding the stack. The alignment tube maintains the HGI geometry, while the upper and lower pressure plates apply mechanical force to the structure during assembly. The pressure plates could be part of an external machine, or could be attached to the alignment tube. For example, the lower pressure plate could have a blind-tapped hole, to which the alignment tube is attached, with an upper pressure plate with a hole in it that would slide down the alignment tube as the structure is pressed together. The pressure plates do not have to be permanently attached to the HGI after removal of the sacrificial alignment tube. However, the pressure plates could remain attached to the HGI, e.g. forming electrodes for the HGI. Most likely, the pressure plates would be reusable, and made out of some material that was optimized for long life, high pressure, and "non-stickiness" (i.e., when pressure was removed, the plates would not adhere to the HGI material). The material that provides the optimal combination of these properties probably is not the optimal material for the HGI itself, and so it probably would not be an electrode.

As shown in FIG. 2A, a stack 20 of alternating individual conductor layers 22 and insulator layers 24 is formed within alignment tube 26. Alignment tube 26 is typically made of metal, e.g. copper, and has a height at least equal to the height of the HGI. Alignment tube 26 has an outward taper 28 along its top edge to facilitate insertion of the layers 22, 24 therein. Alignment tube 26 sits on a lower or bottom pressure plate 30. Alignment tube 26 may be removably attached to bottom pressure plate 30. The inner diameter of alignment tube 26 is selected to snuggly but slidably receive the alternating layers 22, 24. Once alignment tube 26 is placed on lower pressure plate 30, precut layers 22, 24 are alternately placed into the alignment tube 26, e.g. by robotic assemblers preloaded with the layers or even manually. The process continues until a stack of alternating layers of the desired height is achieved, i.e. until the desired number of layers is reached. A top or upper pressure plate 32 is then placed into the alignment tube on top of the last layer. Upper pressure plate 32 is sized so that it snuggly but slidably fits into alignment tube 26.

Once the complete stack of alternating layers 22, 24 is formed within alignment tube 26, over lower pressure plate 30 and with upper pressure plate 32 in place, the assembly is hot pressed so that the individual layers 22, 24 are bonded into completed HGI units. Arrows 34, 36 represent the applied pressure. An advantage of the process is that no adhesive is needed for the bonding of the layers. Since the individual layers 22, 24 were precut to their final shapes, the hot pressed stack has the correct shape for the finished HGI.

The only remaining step is the removal of the alignment tube 26. Once the assembly has been hot pressed into a final HGI, the alignment tube 26 is removed by any suitable method. A preferred method is to dissolve the alignment tube in an acid that is chosen to dissolve the alignment tube rapidly and to not attack the metal layers in the HGI. For example, if stainless steel is chosen for the metal layers and copper is chosen for the alignment tube, nitric acid would be an appropriate acid to accomplish this task. The copper alignment tube could also be mechanically machined away or removed by other copper etching compounds.

Once the alignment tube is removed, top and bottom electrodes are attached to stack 20, so that a freestanding HGI similar to HGI 10 of FIG. 1 is obtained. The HGI stack 20 formed in FIG. 2A (and similarly HGI stack 40 in FIG. 3A) has been preassembled in the final shape, using thin layers precut to the right shape, before hot pressing. The method of the invention employs a sequence of steps that are relatively easy to carry out.

Figure 2C:
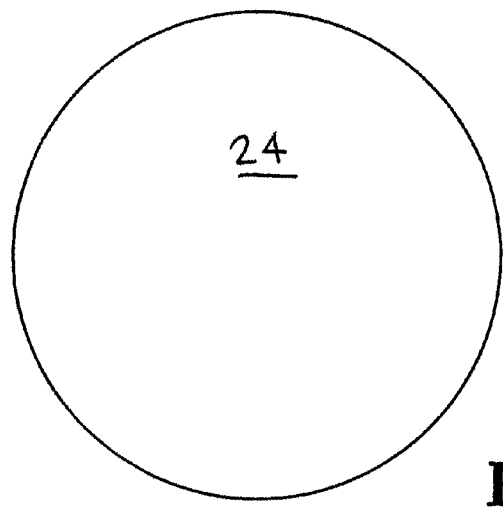
FIG. 2A is a cross-sectional view of a solid cylinder shaped HGI being formed inside an alignment tube according to the invention.
Figure 3A:
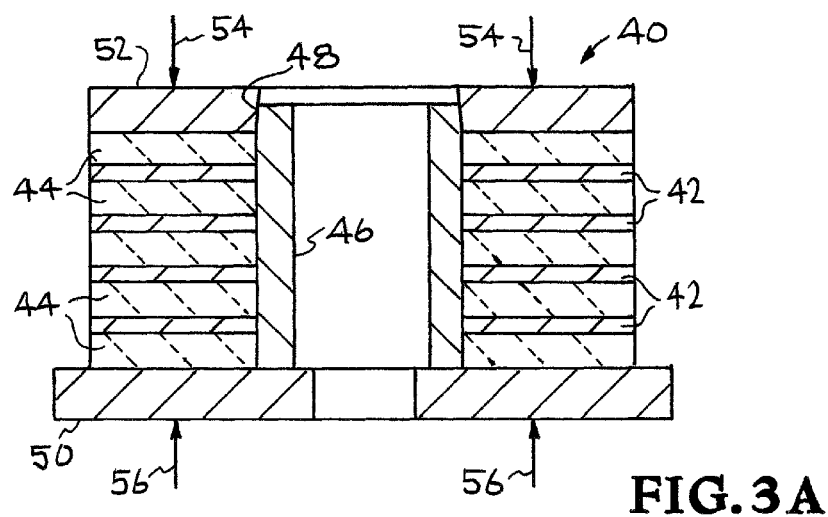
FIG. 3A is a cross-sectional view of a hollow cylinder shaped HGI being formed outside an alignment tube according to the invention.
Figure 3B:
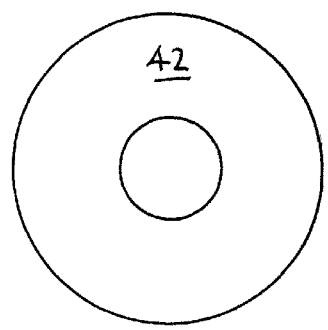
FIGS. 3B, C are top plan views of individual metal and dielectric layers, respectively, for the fabrication of an HGI, as in FIG. 3A, according to the invention.
Figure 3C:
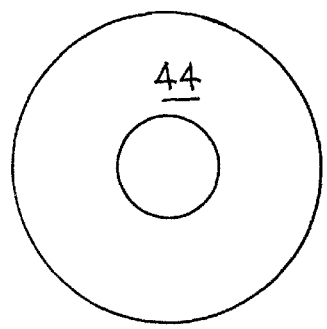

FIGS. 3A-C are similar to FIGS. 2A-C except that the HGI is not a solid cylinder but a cylinder with a central aperture or bore, i.e. tubular in shape. FIG. 3A shows the fabrication of an HGI stack 40 having a tubular shape. HGI stack 40 is formed of alternating conductor layers 42 and dielectric (insulator) layers 44. Individual conductor and dielectric (insulator) layers 42, 44 respectively are shown in FIGS. 3B, C; layers 42, 44 have annular shapes. As with layers 22, 24, the layers 42, 44 can easily be stamped or otherwise cut from sheets of the appropriate material. The stamping or other process can provide stacks of each layer material of the desired shape that can be placed in an HGI assembly robot for further use in efficiently carrying out the invention.

Again, a sacrificial alignment tube is used to maintain the alignment of the individual layers while they are assembled and up to the completion of the pressing operation where the individual layers are bonded into complete HGI units. The alignment tube preferably has a tapered top edge that facilitates the placement of each layer around the alignment tube.

As shown in FIG. 3A, a stack 40 of alternating individual conductor layers 42 and insulator layers 44 is formed around alignment tube 46. Alignment tube 46 is similar to alignment tube 26 but has an inward taper 48 along its top edge to facilitate insertion of the layers 42, 44 therearound. Alignment tube 46 sits on a lower pressure plate 50, and may be removably attached thereto. The outer diameter of alignment tube 46 is selected to snuggly but slidably receive the alternating layers 42, 44 along its outer surface. Once alignment tube 46 is placed on lower pressure plate 50, precut layers 42, 44 are alternately placed around the alignment tube 46, e.g. by robotic assemblers preloaded with the layers or even manually. The process continues until a stack of alternating layers of the desired height is achieved, i.e. until the desired number of layers is reached. An upper pressure plate 52 is then placed around the alignment tube on top of the last layer. The upper pressure plate 52 is sized so that it snuggly but slidably fits around alignment tube 46.

Once the complete stack of alternating layers 42, 44 is formed around alignment tube 46, over lower pressure plate 50 and with top pressure plate 52 in place, the remaining processing is similar to that described above with respect to FIG. 2A. The assembly is hot pressed so that the individual layers 42, 44 are bonded into completed HGI units. Arrows 54, 56 represent the applied pressure. Since the individual layers 42, 44 were precut to their final shapes, the hot pressed stack has the correct shape for the finished HGI. Once the assembly has been hot pressed into a final HGI, the alignment tube 46 is removed by any suitable method. Again, a preferred method is to dissolve the alignment tube in an acid that is chosen to dissolve the alignment tube rapidly and to not attack the metal layers in the HGI. Electrodes would then be attached to complete the HGI.

Figure 4:
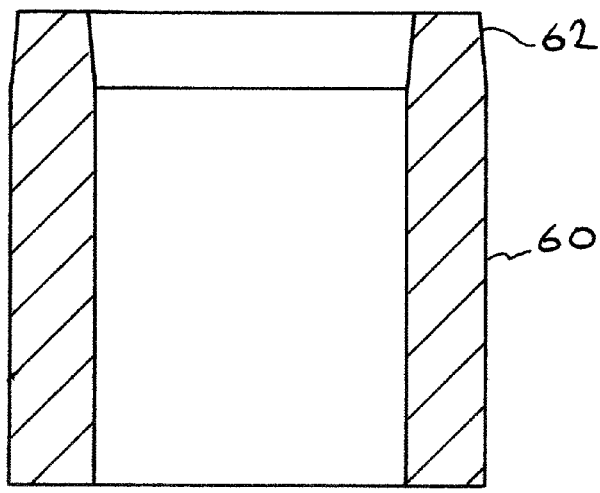
FIG. 4 is a cross-sectional view of the dual taper top edge of an alignment tube that can be used to fabricate either of the HGI shapes shown in FIG. 2A or 3A.

The alignment tube is an important element to carry out the invention. Alignment tubes of different diameters and heights, as well as different materials may be provided. Alignment tubes specifically designed for use with the HGI shapes of FIGS. 2A or 3A may be provided, i.e. having outward or inward tapers along the top edge. Alternately, the alignment tube may have a dual taper, as shown in FIG. 4, so that it can be used for both HGI shapes, i.e metal and dielectric layers may be placed inside or outside of the alignment tubes. The alignment tube 60, with a dual taper 62, allows easy insertion of the layers inside tube 60 or around tube 60. While solid disc layers such as layers 22, 24 of FIGS. 2B, C must be placed inside an alignment tube, annular layers such as layers 42, 44 of FIGS. 3B, C may be placed either outside or inside, i.e. layers 42, 44 may be placed outside as shown in FIG. 3A but alternatively could be placed inside a larger alignment tube, as in FIG. 2A.

Figure 5:
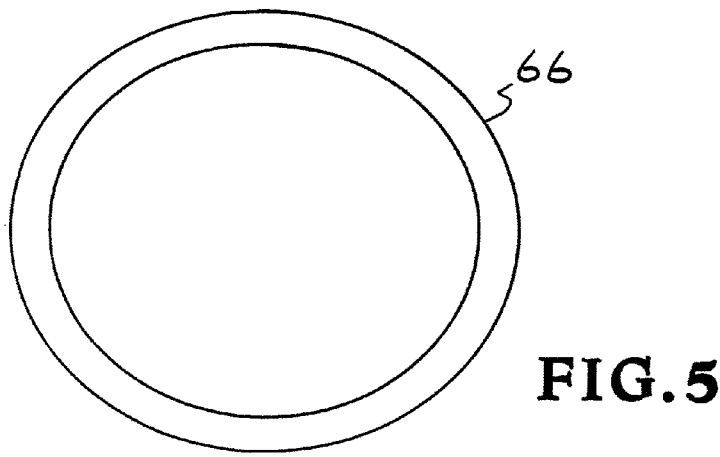
FIG. 5 is a top plan view of an alignment tube with a non-circular cross-section.

While HGI's typically have a circular cross-section, i.e. are shaped as circular cylinders or tubes, they may have different shapes, and the invention is easy to implement for such different HGI shapes. For example, FIG. 5 shows an alignment tube 66 having an oval or elliptical cross-section. Alignment tube 66 would be used with precut layers of conductors and dielectrics having the right shape to fit within or around alignment tube 66.

Figure 6A:
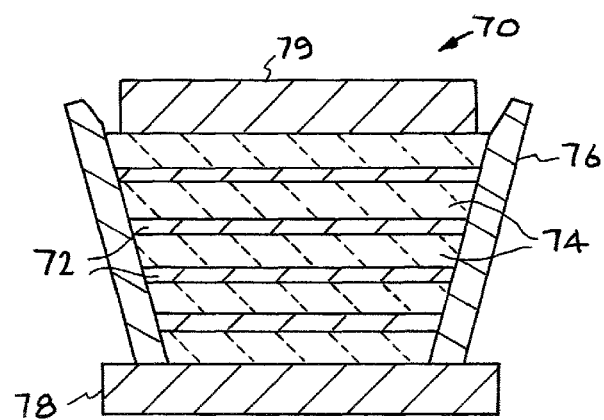
FIGS. 6A, B are cross-sectional views of concical shaped HGI's being formed inside and outside conical alignment tubes according to the invention.

The alignment tube does not need to be a right cylinder. The alignment tube diameter could vary along its length in order to provide a conical HGI assembly, as shown in FIGS. 6A, B. Obviously the metal and dielectric layers would also have to have their diameters vary along the HGI length, and would have to be loaded onto the alignment tube in the correct order.

Figure 6B:
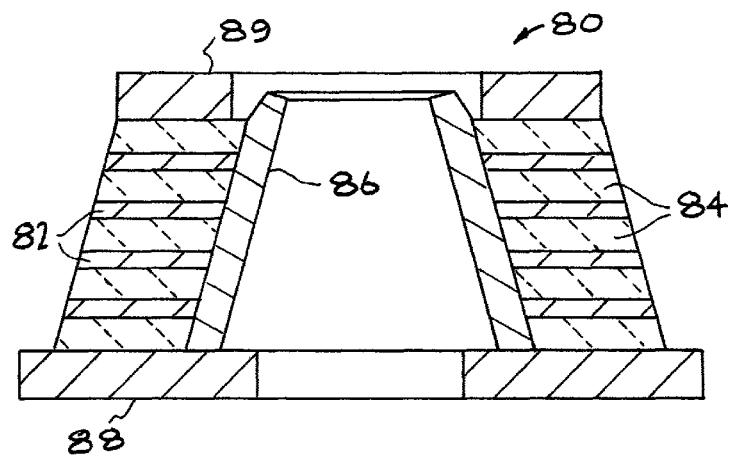

In FIG. 6A a conical stack 70 of alternating individual conductor layers 72 and insulator layers 74 is formed inside conical alignment tube 76. Alignment tube 76 sits on lower pressure plate 78, and upper pressure plate 79 is placed over the last layer of stack 70. The assembly is then processed as previously to form a conical HGI. In FIG. 6B a conical stack 80 of alternating individual conductor layers 82 and insulator layers 84 is formed outside conical alignment tube 86. Alignment tube 86 sits on lower pressure plate 88, and upper pressure plate 89 is placed over the last layer of stack 80. The assembly is then processed as previously. In FIG. 6A, the individual layers 72, 74 must have the proper taper along their outside edges, while in FIG. 6B, the individual layers 82, 84 must have the proper taper along both their outside and inside edges.

The invention thus provides a method for making high gradient insulators (HGI's) that may be utilized in a variety of high voltage electrical energy storage and transmission structures and devices. These include capacitors, transmission lines, and Blumlein pulse generators in dielectric wall accelerators (DWAs). Because the individual layers are precut from thin sheets of material, using simple cutting techniques, that part of the process is easy compared to cutting the final HGI from an already fabricated laminated multilayer structure. The individual precut layers are then easily assembled into a stack having the desired final shape using an alignment tube. The hot pressing technique is similar for both but the present invention only requires the pressing of the actual HGI unit, and not the extra material from the wider sheets of material that are used to produce the laminate. Finally, the removal of the alignment tube, e.g. by simple acid dissolution, is much easier than cutting the HGI out of the pressed laminate. Thus the invention provides a method for making HGI's that is easy and efficient to carry out, and that may be readily automated.

The sacrificial tube approach of the invention simplifies production and reduces costs. The sacrificial tube approach goes in the opposite direction by punching or machining a series of rings or discs out of individual layers of dielectric or metal. These rings or discs are then stacked and pressed at high temperature to form the final structure, without needing any adhesive. So, instead of the prior art stack-then-cut approach, this invention is the opposite, a cut-then-stack method.

Figure 7A:
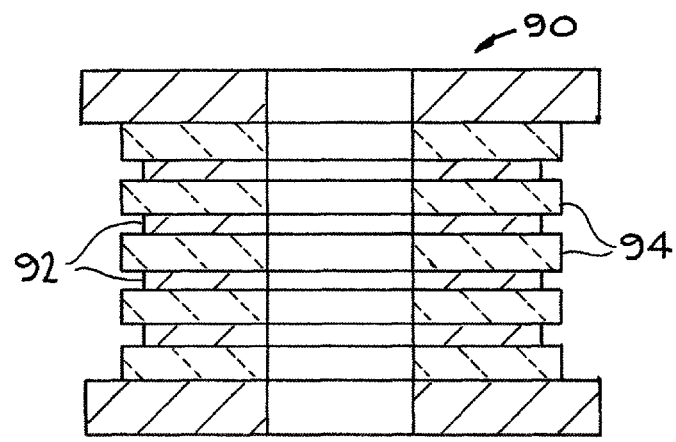
FIGS. 7A, B are cross-sectional views of high gradient insulators (HGI's) having dielectric layers that extend further outwardly or inwardly, respectively, that may be readily fabricated by the invention.
Figure 7B:
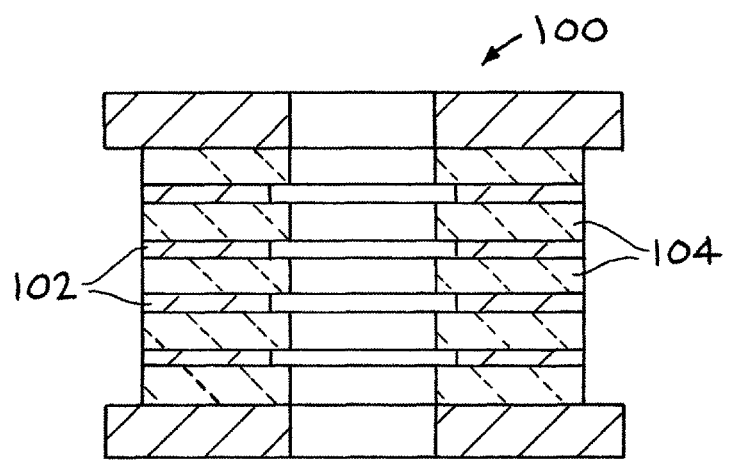

In addition to simplifying production and reducing costs, the invention may have some real benefit to the voltage-holding capability of the insulators. By stamping or cutting individual layers, and then assembling them into stacks, it should be much easier to control the surface structure, and therefore to optimize the insulators' performance. By varying the shape of the precut layers, the HGI geometry can be tailored to optimize its electrical properties. For example, experiments indicated that one failure mechanism for HGIs is the initiation of vacuum arc discharges between adjacent metal layers. By using annular dielectric layers with a larger outside diameter than the annular metal layers (in the case of an inside-aligned structure) or annular dielectric layers with a smaller inside diameter than the annular metal layers (in the case of an outside-aligned structure), the insulator layers will protrude beyond the metal layers, eliminating any line of sight between adjacent metal layers in interrupting vacuum arcing between the layers. FIG. 7A shows an HGI 90, formed by a method using an inner alignment tube as in FIG. 3A, in which the dielectric layers 94 extend out further than the metal layers 92. FIG. 7B shows an HGI 100, formed by a method using an outer alignment tube as in FIG. 2A with annular shaped layers, in which the dielectric layers 94 extend in further than the metal layers 92. The central bore of HGI 90 may be coated or filled with some dielectric material to prevent vacuum surface flashover on the inside bore. Likewise, the outer surface of HGI 100 may be coated with some dielectric material to prevent vacuum surface flashover on the outer surface. Similarly, other geometries having favorable operating properties may be achieved by altering the geometries or electrical properties (such as permittivity or conductivity) of the layers along the length of the structures.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. A method of making a high gradient insulator (HGI) having a desired cross-section and height, comprising:
   providing a plurality of conductor layers and of dielectric layers, each layer having the desired cross-section of the HGI;
   providing an alignment tube;
   stacking alternating conductor layers and dielectric layers, each with the desired cross-section, in or around the alignment tube to form a stacked assembly of substantially the desired height;
   bonding the stacked assembly of alternating conductor layers and dielectric layers together while stacked in or around the alignment tube;
   removing the alignment tube from the bonded stacked assembly to form the HGI.

2. The method of claim 1 further comprising placing the alignment tube on a lower pressure plate prior to stacking the alternating layers, and placing an upper pressure plate on top of the stacked assembly of alternating layers prior to bonding.

3. The method of claim 1 wherein the conductor layers are formed of metals or alloys and the dielectric layers are formed of plastic or ceramic.

4. The method of claim 1 wherein the plurality of conductor layers and of dielectric layers are each provided by cutting from sheets of conductor material and dielectric material respectively.

5. The method of claim 1 wherein the plurality of conductor layers and of dielectric layers are each provided by stamping from sheets of conductor material and dielectric material respectively.

6. The method of claim 1 wherein the layers of conductor and dielectric materials have a circular disc shape and are stacked in the alignment tube.

7. The method of claim 6 wherein the inner diameter of the alignment tube is selected to snuggly but slidably receive the alternating conductor and dielectric layers.

8. The method of claim 1 wherein the layers of conductor and dielectric materials have an annular shape and are stacked around the alignment tube.

9. The method of claim 8 wherein the outer diameter of the alignment tube is selected to snuggly but slidably receive the alternating conductor and dielectric layers along its outer surface.

10. The method of claim 1 wherein the alignment tube has an outward taper or an inward taper along its top edge to facilitate stacking of the layers in or around the alignment tube respectively.

11. The method of claim 1 wherein the alignment tube has a dual inward and outward taper along its top edge to facilitate stacking of the layers either in or around the alignment tube.

12. The method of claim 1 wherein the stacked assembly of layers is bonded together by hot pressing.

13. The method of claim 1 wherein the alignment tube is removed by dissolving the alignment tube in an acid that is chosen to dissolve the alignment tube rapidly and to not attack the metal layers in the HGI.

14. The method of claim 1 further comprising placing the alignment tube on a bottom pressure plate prior to stacking alternating layers of conductor and dielectric layers in or around the alignment tube.

15. The method of claim 14 further comprising placing a top pressure plate on the last layer of the stacked assembly of layers prior to bonding the stacked layers, the top pressure plate having the same cross-section as the layers.

16. The method of claim 15 wherein bonding the stacked layers together further comprises applying pressure to the top and bottom pressure plates while heating the stacked assembly of layers.

17. The method of claim 1 wherein the conductor and dielectric layers have a noncircular cross-section, and the alignment tube has a similar shape.

18. The method of claim 1 wherein the alignment tube is conical in shape, and the alternating conductor and dielectric layers have diameters that vary along the height of the alignment tube to form a conical HGI.

19. The method of claim 1 wherein the layers of conductor and dielectric materials have an annular shape, the dielectric layers having a larger outer diameter than the conductor layers, and are stacked around the alignment tube to form an HGI having the dielectric layers protruding outwardly beyond the conductor layers.

20. The method of claim 1 wherein the layers of conductor and dielectric materials have an annular shape, the dielectric layers having a smaller inner diameter than the conductor layers, and are stacked in the alignment tube to form an HGI having the dielectric layers protruding inwardly beyond the conductor layers.

21. A high gradient insulator (HGI) formed by the method of claim 19.

22. A high gradient insulator (HGI) formed by the method of claim 20.

23. A method of making a high gradient insulator (HGI), comprising:
  pre-cutting individual layers of the HGI to their final dimensions;
  stacking the individual pre-cut layers to form an assembly;
  pressing the assembly into an HGI unit with the desired dimensions.

24. The method of claim 23 wherein the pre-cut individual layers are stacked in or around a sacrificial alignment tube to form the assembly, and further comprising removing the alignment tube after pressing the assembly.

* * * * *